US011067724B2

(12) United States Patent
Perreault et al.

(10) Patent No.: US 11,067,724 B2
(45) Date of Patent: Jul. 20, 2021

(54) FRESNEL-BASED VARIFOCAL LENS ASSEMBLY FOR VR OR AR DISPLAYS (71) Applicant: Google LLC, Mountain View, CA (US)

(72) Inventors: John D. Perreault, Mountain View, CA (US); Oscar Martinez, Mountain View, CA (US)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 16/258,979

(22) Filed: Jan. 28, 2019

(65) Prior Publication Data
US 2020/0132888 A1 Apr. 30, 2020

Related U.S. Application Data (60) Provisional application No. 62/751,133, filed on Oct. 26, 2018.

(51) Int. Cl.
G02B 3/08 (2006.01)
G06F 3/01 (2006.01)
G06F 3/14 (2006.01)
G02B 27/01 (2006.01)

(52) U.S. Cl.
CPC ........... *G02B 3/08* (2013.01); *G02B 27/0172* (2013.01); *G06F 3/013* (2013.01); *G06F 3/14* (2013.01)

(58) Field of Classification Search
CPC .. G02B 3/08; G02B 27/0172; G02B 26/0875; G02B 27/0075; G02B 27/0093; G06F 3/013; G06F 3/14; G06F 3/011; G09G 3/003; H04N 13/322
See application file for complete search history.

(56) References Cited

U.S. PATENT DOCUMENTS

| 5,940,152 | A | 8/1999 | Wilson et al. |
| 7,841,715 | B1 | 11/2010 | Morrison |
| 8,040,617 | B2 * | 10/2011 | Jang ..................... H04N 13/346 359/743 |
| 8,668,338 | B2 | 3/2014 | Johansson et al. |
| 10,215,890 | B2 | 2/2019 | Perreault et al. |
| 10,495,790 | B2 * | 12/2019 | Smith ................ G02B 27/0172 |
| 2018/0261146 | A1 | 9/2018 | Van't Hooft et al. |
| 2018/0343443 | A1 | 11/2018 | Perreault et al. |

OTHER PUBLICATIONS

International Search Report and Written Opinion dated Dec. 17, 2019 for corresponding International Application No. PCT/US2019/052884, 14 pages.

* cited by examiner

*Primary Examiner* — Tuyen Tra (57) ABSTRACT

A near-eye display system includes a display panel to emit display light representative of a display image and a lens assembly disposed along an optical axis. The lens assembly includes a first phase mask plate having a first major surface facing the display and a second major surface opposite the first major surface, the second major surface implementing a first freeform Fresnel lens structure, and further includes a second phase mask plate adjacent and parallel to the first phase mask plate and having a third major surface facing the second major surface and an opposing fourth majors surface, the third major surface implementing a second freeform Fresnel lens structure. A pose of at least one of the first and second phase mask plates relative to the other is configured to be adjusted so as to adjust an optical power of the lens assembly.

22 Claims, 10 Drawing Sheets

FRESNEL-BASED VARIFOCAL LENS ASSEMBLY FOR VR OR AR DISPLAYS

BACKGROUND

Immersive virtual reality (VR) and augmented reality (AR) systems typically utilize a head mounted display (HMD) device or other near-eye display system that presents stereoscopic imagery to the user so as to give a sense of presence in a three-dimensional (3D) scene. Such near-eye display devices typically employ at least one display panel to provide a left-eye display and a right-eye display, and an optical system to focus the entirety of each display on the corresponding eye. In conventional near-eye display systems, the optical system is focused a single fixed focal distance, which leads to the well-known problem of vergence-accommodation conflict and its deleterious effects on user comfort. While some conventional optical systems have been developed to provide a variable focus length to mitigate vergence accommodation conflict, these approaches often are either too thick to be implemented in an HMD device without causing user discomfort or provide too small of an aperture for sufficient focus tuning variation.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The inverse relationship between focal length and optical power typically results in relatively "thick" optical systems given the magnification parameters preferred for HMDs and other near-eye display systems. The fixed focal length typically provided by such optical systems also leads to vergence-accommodation conflict. Moreover, many potential users require corrective lenses (that is, "eyeglasses"), which are difficult to incorporate into an HMD without requiring a large cavity, which negatively impacts weight distribution and thus user comfort. Described herein are examples of optical systems that provide a more compact form factor for a given focal length, while also providing variable optical power, and thus allowing a near-eye display system implementing the optic system to vary, or "tune", the focal depth of the optical system so as to mitigate vergence-accommodation conflict or to provide a corrective effect for a user's impacted vision.

The optical system includes a display panel configured to emit display light representative of a display image and a lens assembly disposed along an optical axis between the display panel and the expected position of a user's eye. The lens assembly includes two substantially transparent phase mask plates adjacent to each other, including a first phase mask plate facing the display panel (the "display-side phase mask plate") and a second phase mask plate facing the user's eye (the "eye-side phase mask plate"). Each of the phase mask plates includes two opposing major surfaces. The major surfaces of the phase mask plates that face each other are separated by a gap, and each of these two facing major surfaces implements a freeform Fresnel lens structure that at least partially define the gap between the phase mask plates.

With this configuration, the Fresnel lens structures of the phase mask plates are superimposed relative to the optical axis extending from the expected position of the user's eye to the display panel. Accordingly, as the resulting focal depth of the two superimposed phase mask plates is dependent on the phase relationship between the two facing Fresnel lens structures, which in turn is based on the orientation and/or position of the Fresnel lens structure of the first phase mask plate relative to the Fresnel lens structure of the second phase mask plate. Thus, in at least one embodiment, the lens assembly further includes one or more actuators to adjust a pose of the first and second phase mask plates relative to each other (where the term "pose" is used herein to refer to either orientation or position individually, or the combination of orientation and position), and thus adjust the phase relationship and, consequently, the optical power of the lens assembly. This adjustment of the relative pose thus can include lateral translation of at least one of the phase mask plates, rotation of at least one of the phase mask plates relative to the optical axis (or an axis substantially parallel thereto), or a combination thereof. In some embodiments, the adjustment to the pose of the phase mask plates relative to each other includes adjusting the physical position or orientation of only one of the two phase mask plates, while the other phase mask plate remains in a fixed position and orientation relative to the other components of the optical system, and in other embodiments both phase mask plates may be laterally translated or rotated in opposite directions so as to achieve an overall target change in relative pose between the two phase mask plates.

In at least one embodiment, each of the freeform Fresnel lens structures represents a cubic phase function (and with a 2*pi phase winding for a rotation-based implementation), and thus superimposition of the two freeform Fresnel lens structures introduces a variable quadradic effect. In contrast, the outward-facing major surfaces (that is, the display-facing major surface of the first phase mask plate and the eye-facing major surface of the second phase mask plate) may be plano surfaces and thus introduce zero optical power by themselves, or they may be convex or concave surfaces to introduce additional fixed positive or negative optical power in addition to the variable optical power provided by the facing Fresnel lens structures. With this configuration, the lens assembly can tune the overall focal length of the optical system to a focal depth that is more consistent with a depth of one or more objects represented in the image content of the display light and thus better mitigating any potential vergence-accommodation conflict, or providing corrective optical power consistent with the corrective lenses that a user otherwise would require when using a conventional HMD.

Figure 1:
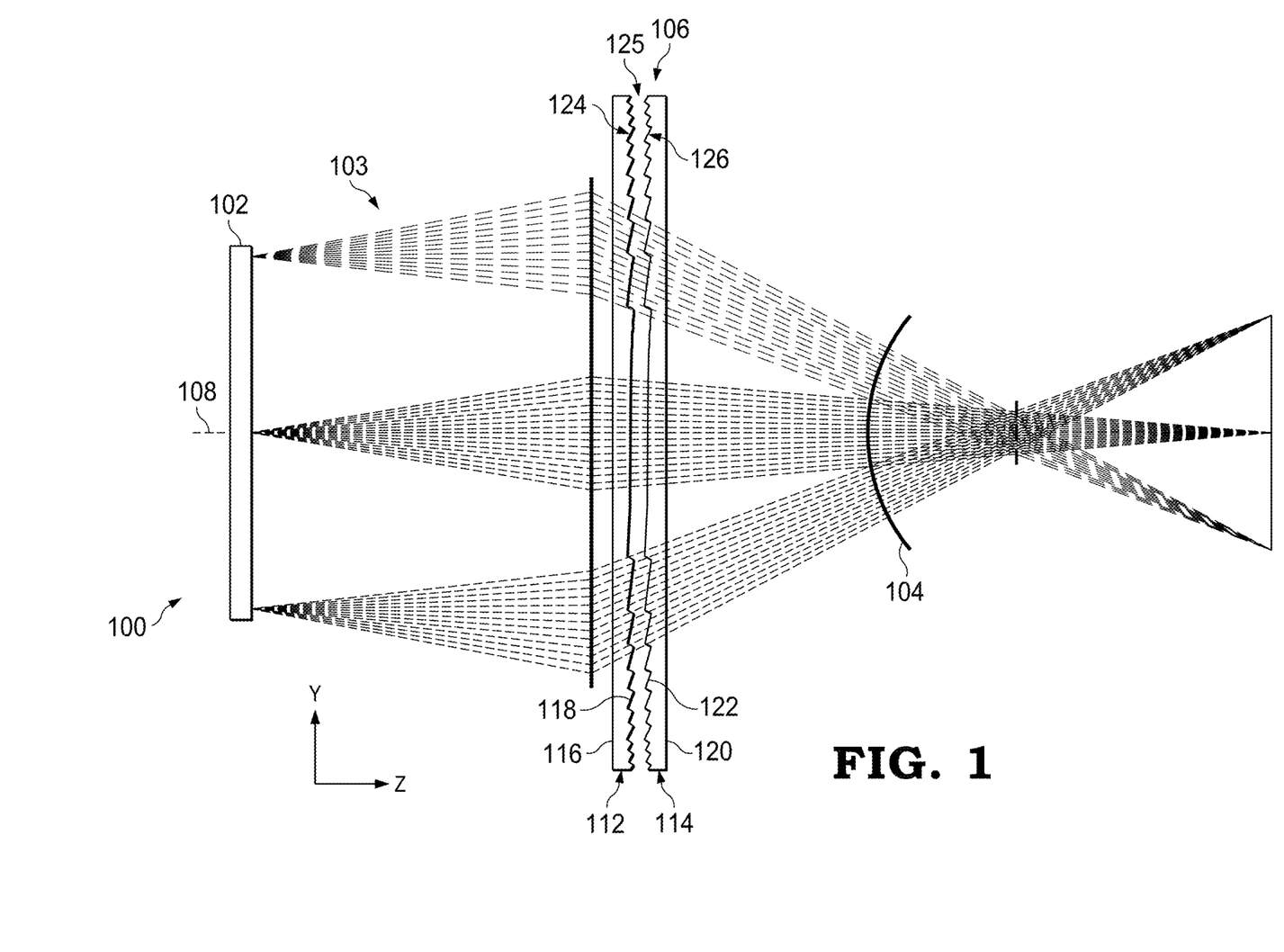
FIG. 1 illustrates a side cross-section view of an example of an optical system employing a Fresnel-based varifocal lens assembly for providing focus tuning according to some embodiments.

FIG. 1 illustrates an optical system 100 having a tunable focal length in accordance with some embodiments. The optical system 100 includes a display panel 102 configured to emit display light 103 representative of one or more display images in the direction of an expected position 104 of an eye of a user of the optical system 100. The optical system 100 further includes a lens assembly 106 disposed along an optical axis 108 extending between the display panel 102 and the expected position 104 of the user's eye. In the depicted embodiment, the lens assembly 106 includes two transmissive phase mask plates 112, 114 disposed along the optical axis 108 and substantially parallel with each other. The phase mask plates 112, 114 can be implemented using optical plastic, optical glass, or other suitable transmissive optical material. The phase mask plate 112 (also referred to herein as "the display-side phase mask plate) includes two opposing major surfaces: a display-facing surface 116 and an opposing surface 118. Similarly, the phase mask plate 114 (also referred to herein as "the eye-side phase mask plate) includes two opposing major surfaces: an eye-facing surface 120 and an opposing surface 122. The phase mask plates 112, 114 are disposed along the optical axis 108 such that the surface 118 of the phase mask plate 112 and the facing surface 122 of the phase mask plate 114 define a gap 125 between the phase mask plates 112, 114. This gap 125 may be an air gap or, in some embodiments, the lens assembly 106 may be configured so as to maintain an optical oil or other fluid between the phase mask plates 112, 114 so that the gap 125 is a fluid-filled gap. This fluid can reduce ghost image artifacts from Fresnel reflections by reducing the index of refraction transition, and further may lubricate or otherwise facilitate rapid oscillation of the phase mask plates 112, 114.

In at least one embodiment, the surface 118 of the display-side phase mask plate 112 implements a freeform Fresnel lens structure 124 (that is, a surface with freeform Fresnel facets that extend from, or extend into, the body of the phase mask plate 112) and the surface 122 of the eye-side phase mask plate 114 likewise implements a freeform Fresnel lens structure 126. As illustrated by FIG. 1, in some embodiments the freeform Fresnel lens structure 128 is a mirror complement of the freeform Fresnel lens structure 126, whereas in other embodiments the freeform Fresnel lens structure 128 is not a strict complement of the freeform Fresnel lens structure 128. Each of the freeform Fresnel lens structures 126, 128 represents a cubic phase function, and thus the superimposition of the two freeform Fresnel lens structures 126 provides a quadratic phase effect along the optical axis 108 (and thus from the perspective of the eye of the user). As such, changing the pose of the phase mask plate 112 relative to the phase mask plate 114, and thus changing the pose of the Fresnel lens structure 126 relative to the Fresnel lens structure 126, induces a phase variation that is the differential of the cubic surface profiles, resulting in a quadratic phase profile; that is, changes an optical power, and thus focal length, of the lens assembly 106. Accordingly, in at least one embodiment, the lens assembly 106 is configured to adjust or vary the pose of the phase mask plate 112 relative to the phase mask plate 114 via one or more actuators (see FIG. 14) to tune the focus of the lens assembly to a specified optical power or focal length. The adjustment in this pose can include adjustment in relative position of one or both of the phase mask plates 112, 114 relative to each other through lateral translation 130 of one or both phase mask plates in one or more directions along the X-Y plane (that is the plane parallel to the major surfaces 116, 120), adjustment in relative orientation of one or both phase mask plates 112, 114 relative to each other through rotation 132 of one or both phase mask plates along the optical axis 108 (or other axis parallel to the optical axis), or a combination of lateral translation 130 and rotation 132. A translation-based implementation of the lens assembly 106 is described in greater detail below with reference to FIGS. 2-9, while a rotation-based implementation of the lens assembly 106 is described in grater detail with reference to FIGS. 10-12.

In the optical system 100 of FIG. 1, the display-facing surface 116 of the phase mask plate 112 and the eye-facing surface 120 of the phase mask plate 114 are plano surfaces so as to introduce no additional optical power. However, in other embodiments, each of the surfaces 116, 120 may implement a convex surface or a concave surface to introduce a fixed positive or negative optical power in addition to the optical power provided by the superimposition of the Fresnel lens structures 124, 126 in their configured relative pose.

Figure 2:
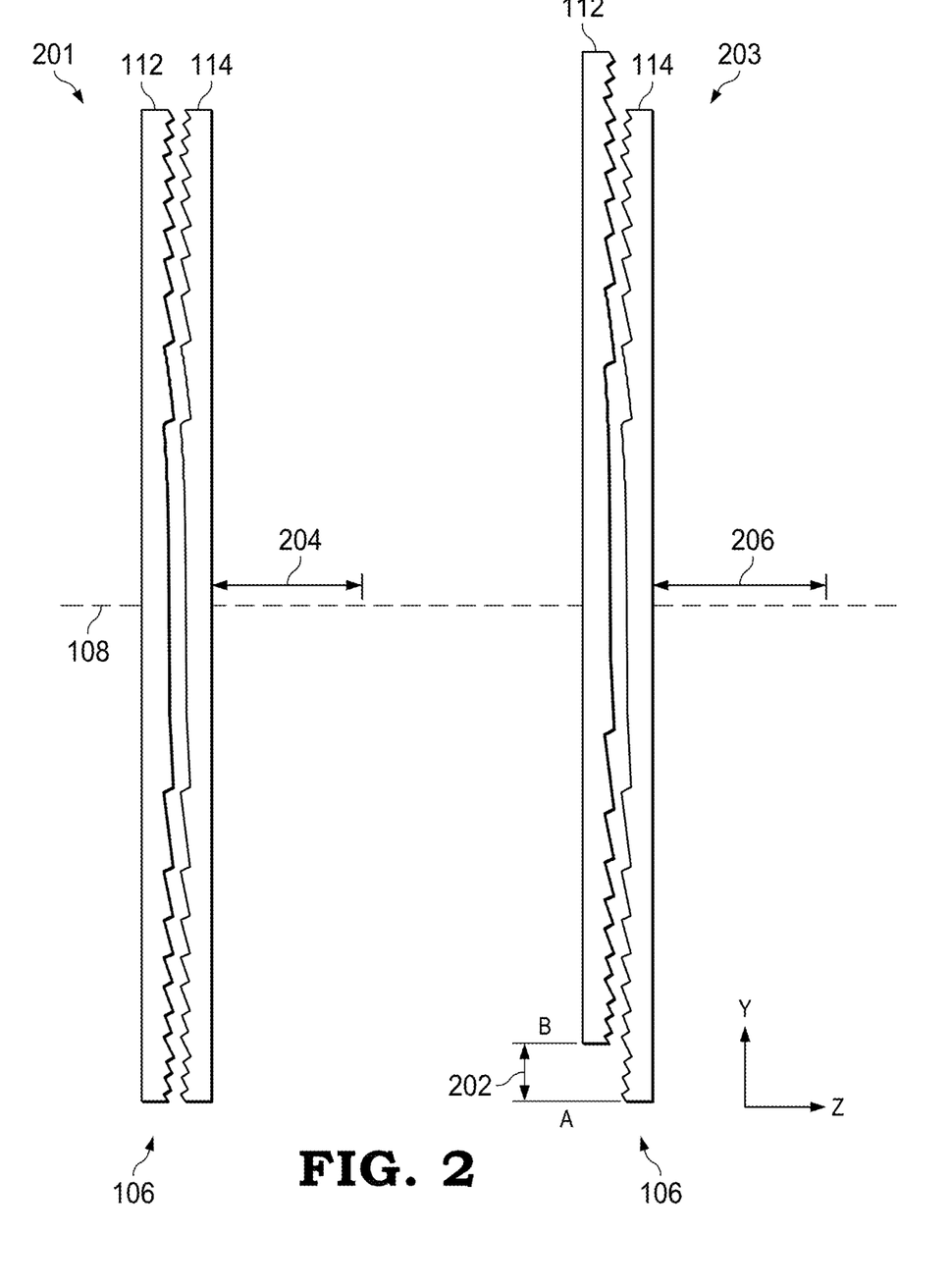
FIG. 2 illustrates focus tuning of a Fresnel-based varifocal lens assembly via adjustment of a pose of a phase mask plate relative to another phase mask plate according to some embodiments.

FIG. 2 illustrates an example of the focus adjustment process provided by the lens assembly 106 in accordance with some embodiments. In this example, the phase mask plate 114 is maintained in a fixed position relative to the other components of the optical system 100, whereas the phase mask plate 112 is configured to be laterally translated along the Y axis so that the position of the phase mask plate 112 changes in the X-Y plane relative to the phase mask plate 114. However, in other embodiments, the phase mask plate 114 instead could be the "moveable" phase mask plate, while the phase mask plate 112 is maintained in a fixed position, or the phase mask plate 114 could be laterally translated in an opposite direction as the lateral translation of the phase mask plate 112, and thus resulting in a net lateral translation that is a sum of the lateral translations of each of the phase mask plates 112, 114.

In cross-section view 201 the lens assembly 106 is configured so that the phase mask plate 112 is positioned at position A relative to the phase mask plate 114, which is fixed in position relative to the optical axis 108. The combination of the phase mask plates 112, 114 in this configuration provides the optical profile represented in view 201, and thus a corresponding optical power and focal length 204. As shown by view 203, the phase mask plate 112 is then laterally translated by an amount 202 to position B relative to the phase mask plate 114 and the optical axis 108. The relative poses of the phase mask plates 112, 114 in this revised configuration provides the revised optical profile represented in view 203, and thus a corresponding adjusted optical power and adjusted focal length 206. Thus, by controlling the amount 202 of lateral translation of the phase mask plate 112, the optical system 100 can tune the focal length of the lens assembly to a focus length or optical power better suited to the depth characteristics of a display image to displayed at the display panel 102. A similar effect may be achieved through rotation of one or both of the phase mask plates 112, 114 with suitable Fresnel lens structure configuration, as described below in detail with reference to FIGS. 9-12.

Figure 3:
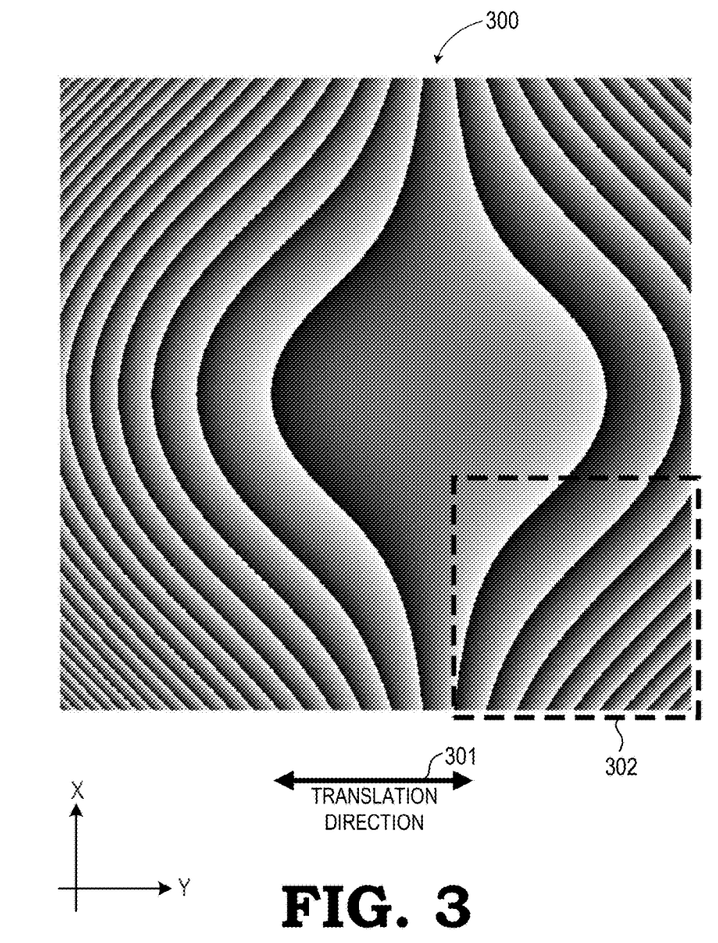
FIGS. 3 and 4 illustrate example optical surface profiles of a display-side phase mask plate and an eye-side phase mask plate, respectively, of a lateral-translation-based implementation of the Fresnel-based varifocal lens assembly of FIG. 1 according to some embodiments.
Figure 4:
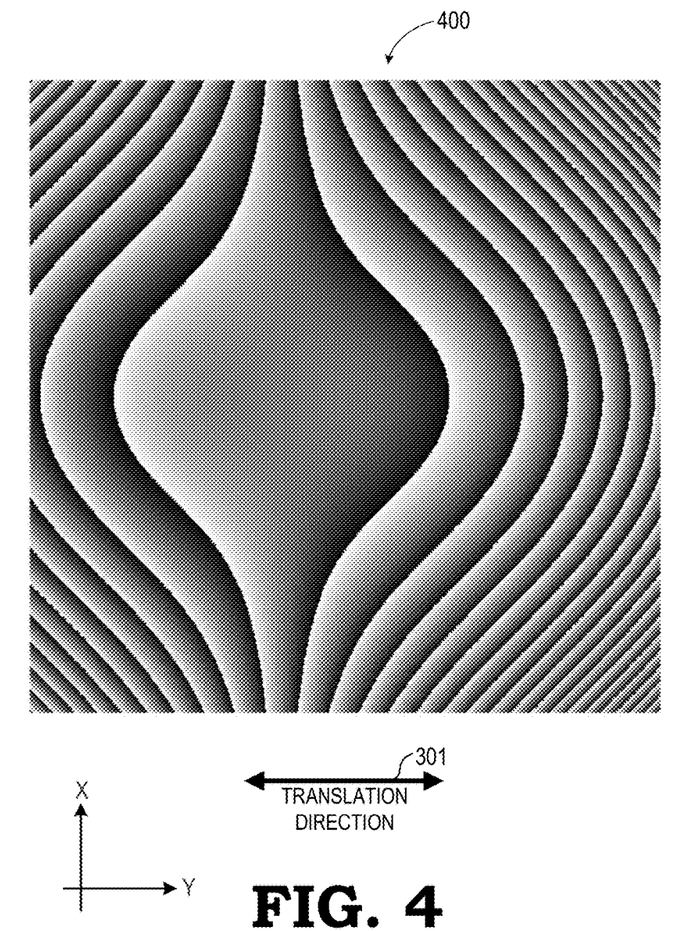

FIGS. 3 and 4 illustrate example optical surface profiles (e.g., "sag maps") for a translation-based implementation of the lens assembly 106 of FIGS. 1 and 2 in accordance with some embodiments. Optical surface profile 300 of FIG. 3 represents an example implementation of the freeform Fresnel lens structure 124 implemented by the phase mask plate 112 and optical surface profile 400 of FIG. 4 represents the counterpart freeform Fresnel lens structure 126 implemented by the phase mask plate 114. In these embodiments, the Fresnel lens structures 124, 126 implement a cubic phase function represented as:

$$\Phi_{ideal}(x, y) = \phi_{ideal}(x, y+h) - \phi_{ideal}(x, y-h)$$

$$= A\left(x^2(y+h) + \frac{(y+h)^3}{3}\right)$$

$$- A\left(x^2(y-h) - \frac{(y-h)^3}{3}\right)$$

$$= 2Ah(x^2 + y^2) + \frac{2Ah^3}{3}.$$

where $\Phi_{ideal}(x,y)$ represents the surface sag at point (x, y), h represents the in-plane lateral displacement between the two phase mask plate 112, 114 in units of millimeters, and A is a design parameter that units of Diopters/mm (D/mm) and determines how rapidly the optical power changes with changes in the lateral displacement. Further, the term $2Ah(x^2+y^2)$ represents the rate of optical power change per unit of lateral translation along axis 301 (that is, diopters per millimeter of lateral translation, or D/mm), whereas the term $$\frac{2Ah^3}{3}$$

represents a constant phase offset independent of the x or y position.

Figure 5:
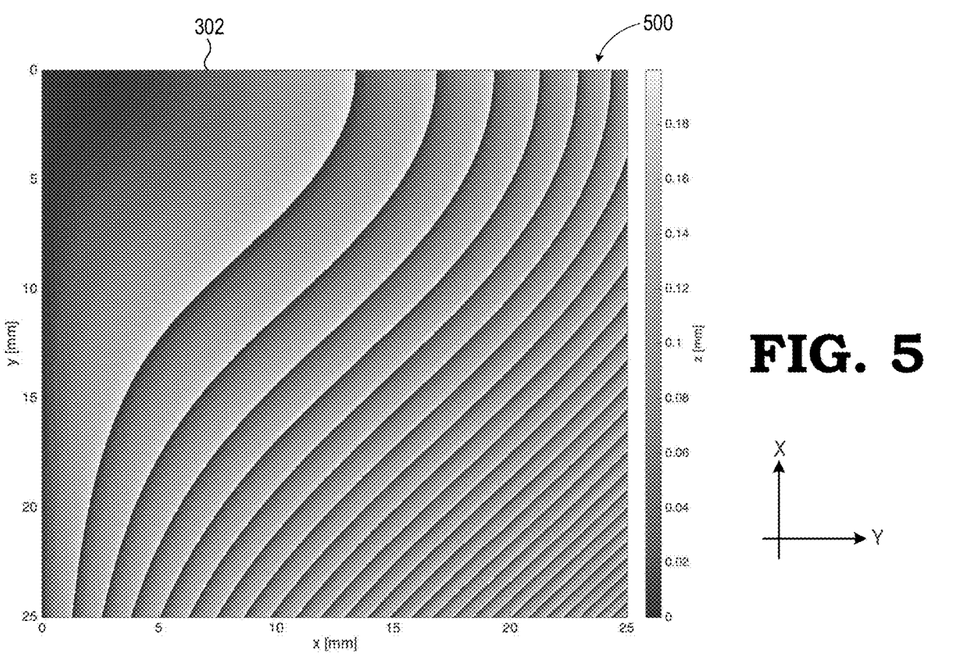
FIG. 5 illustrates an example expanded view of a portion of the optical surface profile of FIG. 3 for a configuration providing 0.5 diopters of focal adjustment for each millimeter of lateral translation according to some embodiments.
Figure 6:
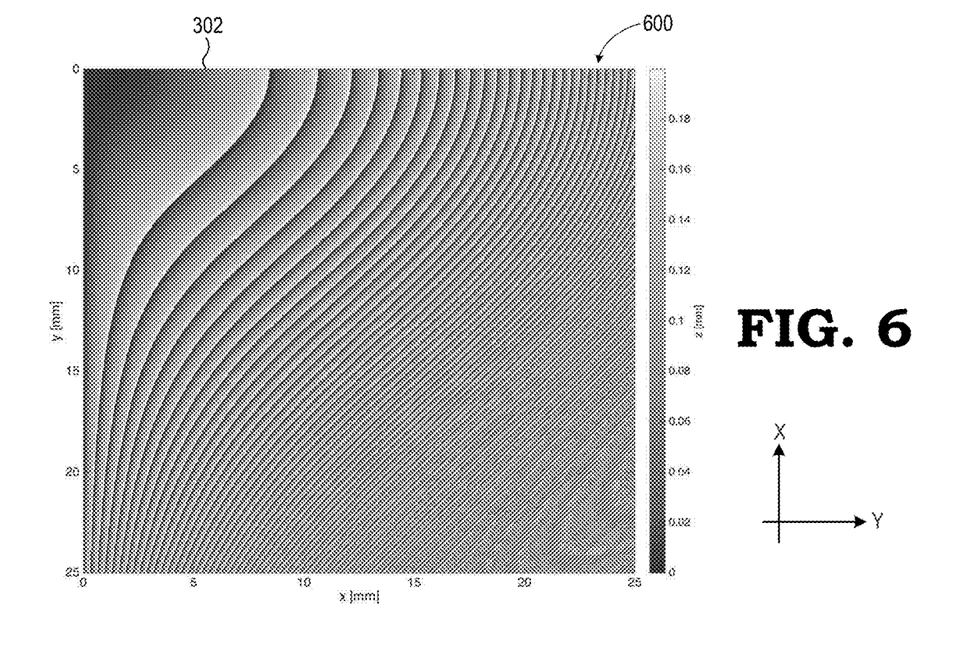
FIG. 6 illustrates an example expanded view of a portion of the optical surface profile of FIG. 3 for a configuration providing 2 diopters of focal adjustment for each millimeter of lateral translation according to some embodiments.

To illustrate, FIGS. 5 and 6 illustrate enlarged views 500 and 600, respectively, of a region 302 of the optical surface profile 300 of FIG. 3 for the Fresnel lens structure 124 of the phase mask plate 112 for different diopter change rates, with the Fresnel lens structure 126 having a corresponding optical surface profile. The enlarged view 500 represents an implementation of the optical surface profile 300 for a diopter change rate of approximately 0.5 D/mm (that is, a change of 0.5 diopters in the optical power provided by the superimposition of the phase mask plates 112, 114 for each millimeter of lateral translation between the two phase mask plates). The enlarged view 600 represents an implementation of the optical surface profile 300 for a diopter change rate of approximately 2 D/mm. Thus, while the implementation of the optical surface profile 300 represented by enlarged view 600 provides a more rapid change in optical power for a given amount of lateral translation, it comes at the tradeoff of a much smaller feature size (e.g., approximately 200 micrometer pitch between Fresnel facets) and thus can be more difficult and expensive to manufacture with acceptable quality standards.

Figure 7:
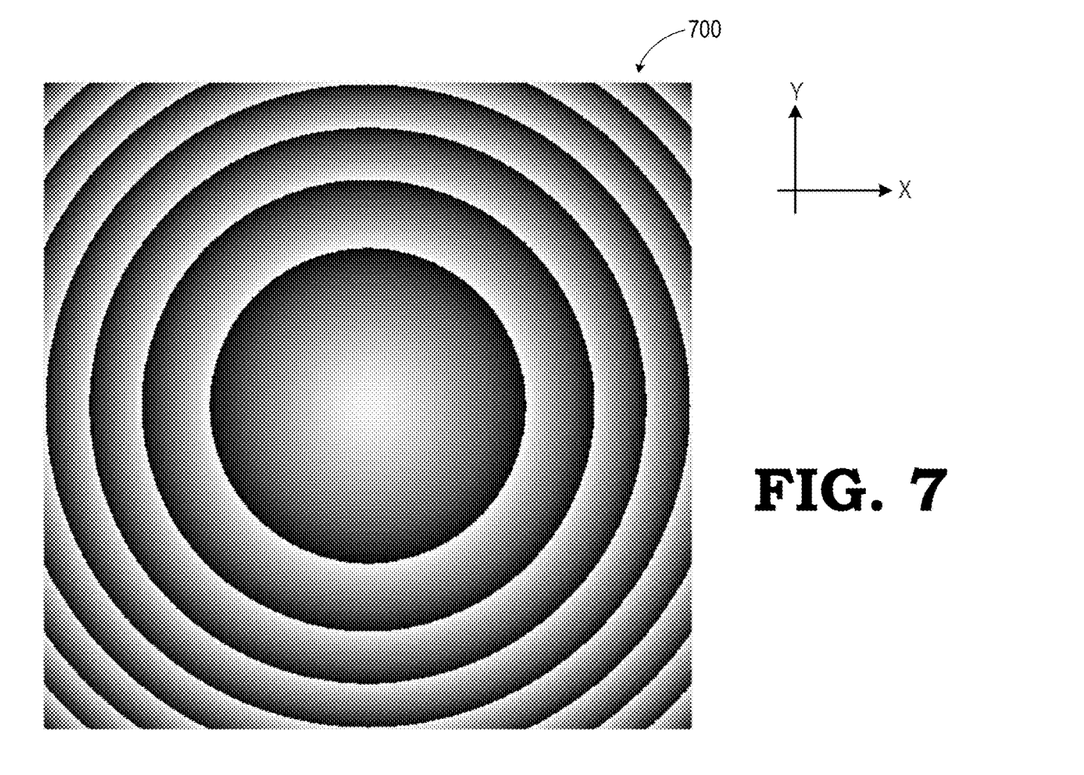
FIG. 7 illustrates an example effective sag map resulting from a superimposition of the display-side phase mask plate and eye-side phase mask plate of FIGS. 3 and 4 according to some embodiments.
Figure 8:
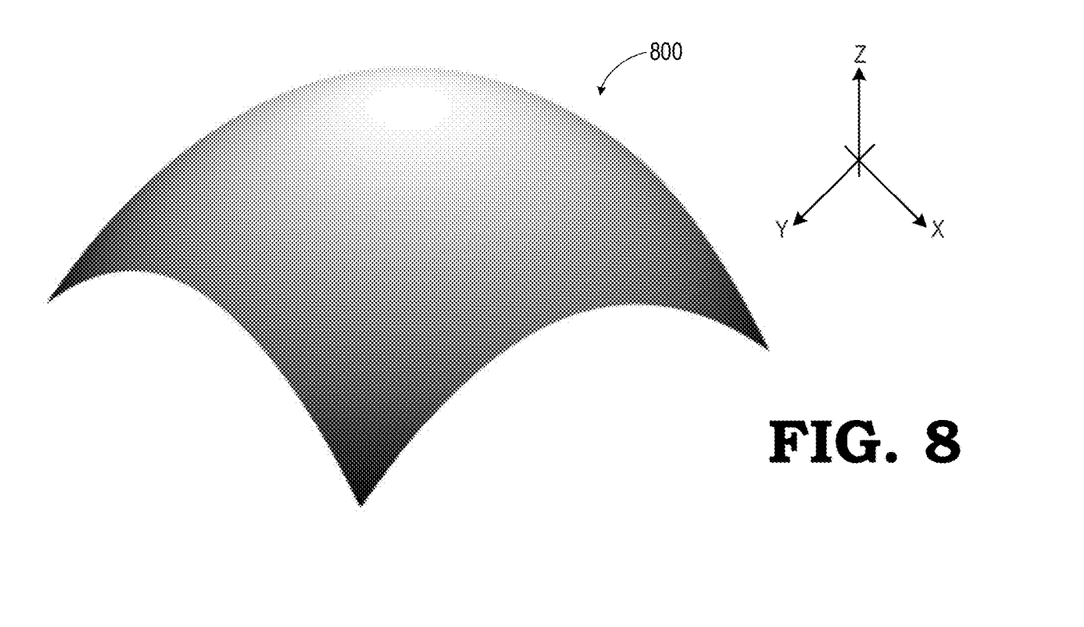
FIG. 8 illustrates a convex lens surface equivalent to the sag map of FIG. 7 according to some embodiments.

FIG. 7 illustrates an effective optical surface profile 700 (phase profile modulo 2*Pi) presented by the lens assembly 106 to the user's eye resulting from the superimposition of the Fresnel lens structures 124, 126 having the optical surface profiles 300, 400, respectively, with the configuration illustrated in enlarged view 500 (providing an optical power rate of change of 0.5 D/mm) when the phase mask plates 112, 114 are in their default positions (that is, with zero relative lateral translation). As shown, the superposition of the optical surface profiles 300, 400 with their cubic phase functions results in the optical surface profile 700 with a classic annular Fresnel lens structure exhibiting a quadratic phase function, and which is varifocal based on the particular lateral translation, or change in relative position, of the two phase mask plates 112, 114. FIG. 8 illustrates an example convex freeform surface 800 that corresponds to the unwrapped phase profile (that is, removing the 2*Pi phase jumps) of the freeform Fresnel optical surface profile 700. In some embodiments, a linear "tilt" term can be used in the cubic phase functions representative of the optical profiles of the Fresnel lens structures 124, 126 so as to reduce the lens sag and the number of zones when the resulting optical surface is converted to the corresponding Fresnel lens structure. In such instances, the phase profile may be represented by the following expression: phi_linear=B*x+C*y, where B and C represent coefficients selected by a designer to reduce the thickness caused by the cubic term near the edges of the phase mask plate.

Figure 9:
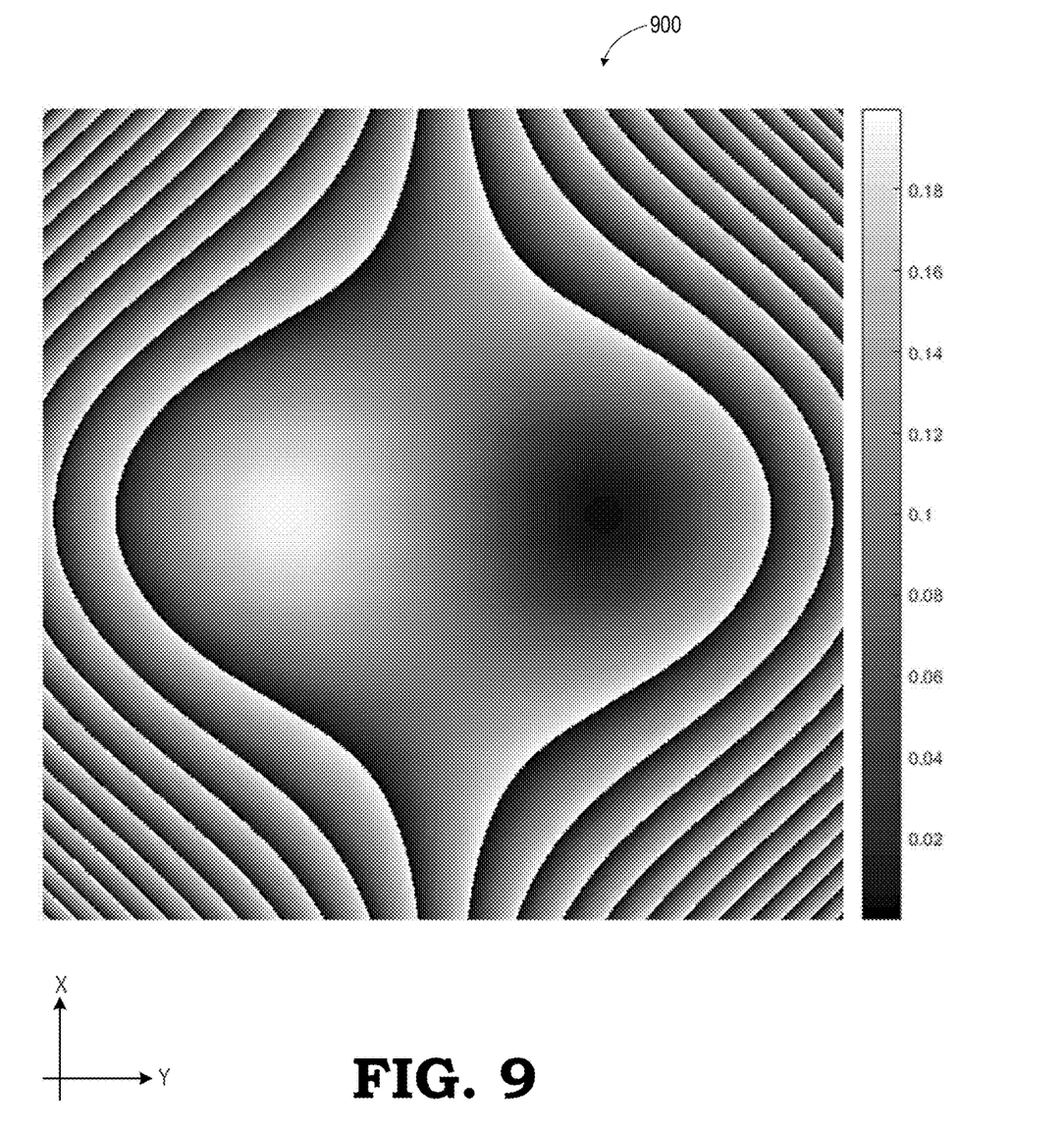
FIG. 9 illustrates an alternative example display-side phase mask plate implementing a linear tilt term according to some embodiments.

FIG. 9 illustrates an example optical surface profile 900 of the Fresnel lens structure 124 implementing this linear tilt term. The optical surface profile of the Fresnel lens structure 124 would be similarly configured. Further, in some embodiments, the optical surface profiles of the Fresnel lens structures 124, 126 may implement higher order polynomial terms to compensate for aberrations introduced by the lens assembly 106 or other optical components of the optical system 100.

Figure 10:
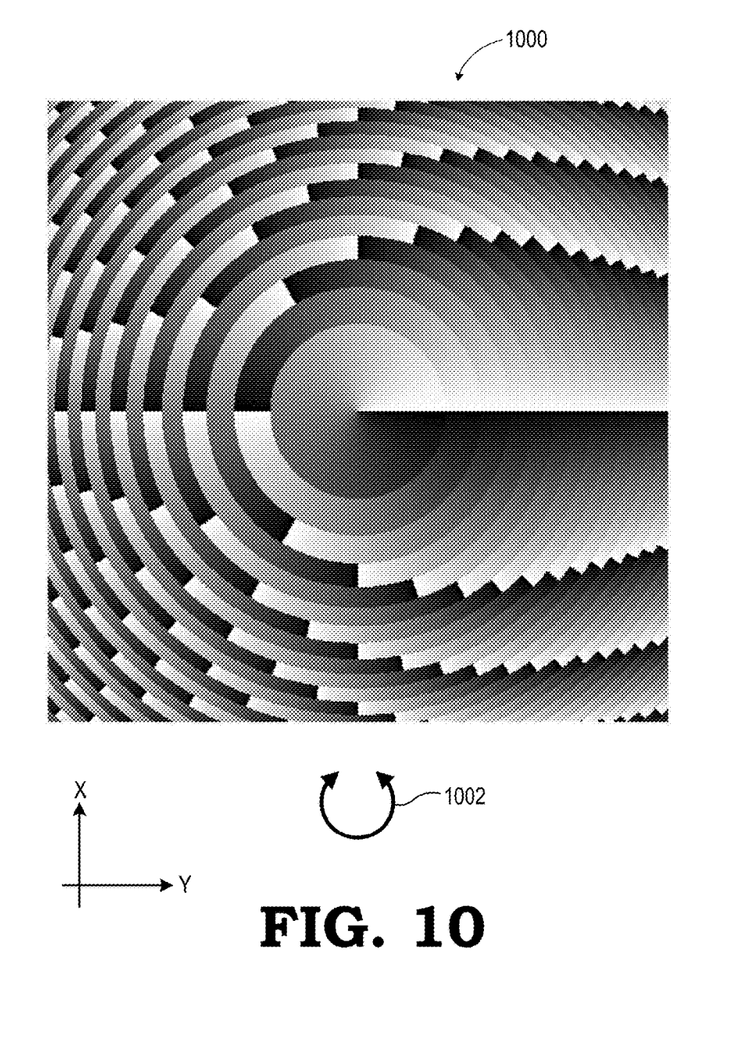
FIGS. 10 and 11 illustrate example sag maps of a display-side phase mask plate and an eye-side phase mask plate, respectively, of a rotation-based implementation of the Fresnel-based varifocal lens assembly of FIG. 1 according to some embodiments.
Figure 11:
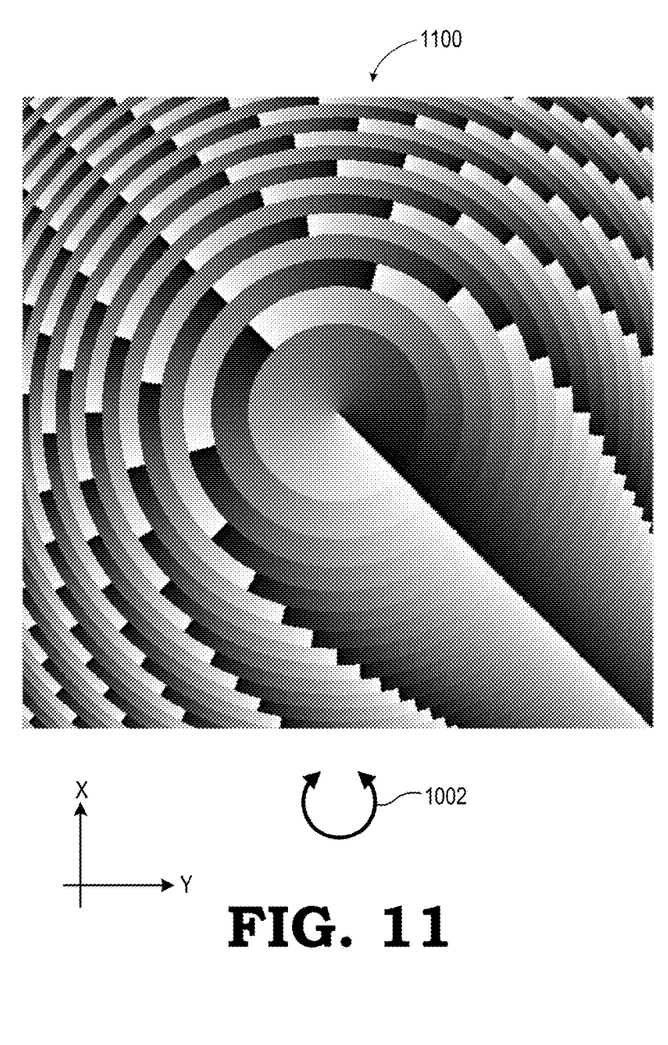
Figure 12:
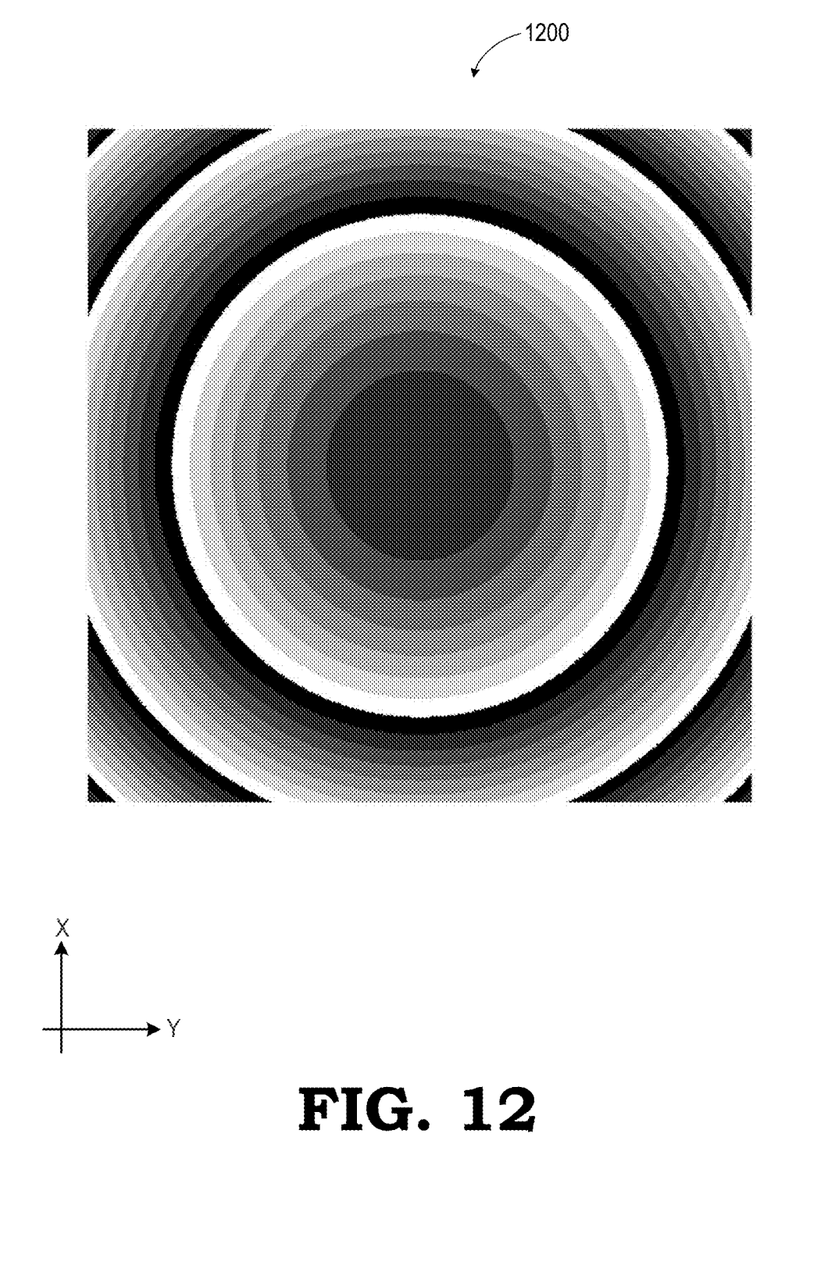
FIG. 12 illustrates an example effective sag map resulting from a superimposition of the display-side phase mask plate and eye-side phase mask plate of FIGS. 10 and 11 according to some embodiments.

FIGS. 10-12 together illustrate an example implementation of the lens assembly 106 that is based on rotation of the two phase mask plates 112, 114 for focus tuning in accordance with some embodiments. FIGS. 10 and 11 illustrate example optical surface profiles 1000, 1100, respectively, for this rotation-based implementation of the lens assembly 106 of FIG. 1 in accordance with some embodiments. Optical surface profile 1000 of FIG. 10 represents an example implementation of the freeform Fresnel lens structure 124 implemented by the phase mask plate 112 and optical surface profile 1100 of FIG. 11 represents the counterpart freeform Fresnel lens structure 126 implemented by the phase mask plate 114. In these embodiments, the Fresnel lens structures 124, 126 implement a quadratic phase function with a 2*pi phase winding, which in turn results in a variable quadratic effect based on rotation of one or both of the phase mask plates 112, 114 relative to the other phase mask plate along a rotation axis 1002. FIG. 12 illustrates an effective optical surface profile 1200 presented by the lens assembly 106 to the user's eye resulting from the superimposition of the Fresnel lens structures 124, 126 having the optical surface profiles 1000, 1100, respectively when the phase mask plates 112, 114 are in their default positions (that is, with zero relative orientation adjustment). As shown, the superposition of the optical surface profiles 1000, 1100 with their quadratic phase functions with 2*pi winding results in the optical surface profile 1200 with a classic annular Fresnel lens structure exhibiting a quadratic phase function, and which is varifocal based on the particular relative rotation, or change in relative orientations, of the two phase mask plates 112, 114. In particular, the phase maps for the optical surface profiles 1000, 1100 and the resulting effective optical surface profile 1200 may be represented as:

$$T_1 = \exp[iar^2\varphi]$$

$$T_2 = \exp[-iar^2(\varphi-\theta)]$$

$$T_{joint} = \exp[iar^2\theta]$$

where $T_1$ represents the phase map for the optical surface profile 1000, $T_2$ represents the phase map for the optical surface profile 1100, $T_{joint}$ represents the effective phase map for optical surface profile 1200 resulting from the superimposition of the optical surface profiles 1000, 1100 along the optical axis 108 (FIG. 1). Further, i represents the imaginary number sqrt(−1), r is the radial coordinate of the phase mask, $\varphi$ is the polar angle, and $\theta$ represents the relative angle of rotation between the two phase mask plates. Further, as similarly noted above, the phase maps for the optical surface profiles 1100, 1200 may implement higher-order polynomial terms to pre-compensate for aberrations introduced by the lens assembly 106 or other optical components of the optical system 100.

Figure 13:
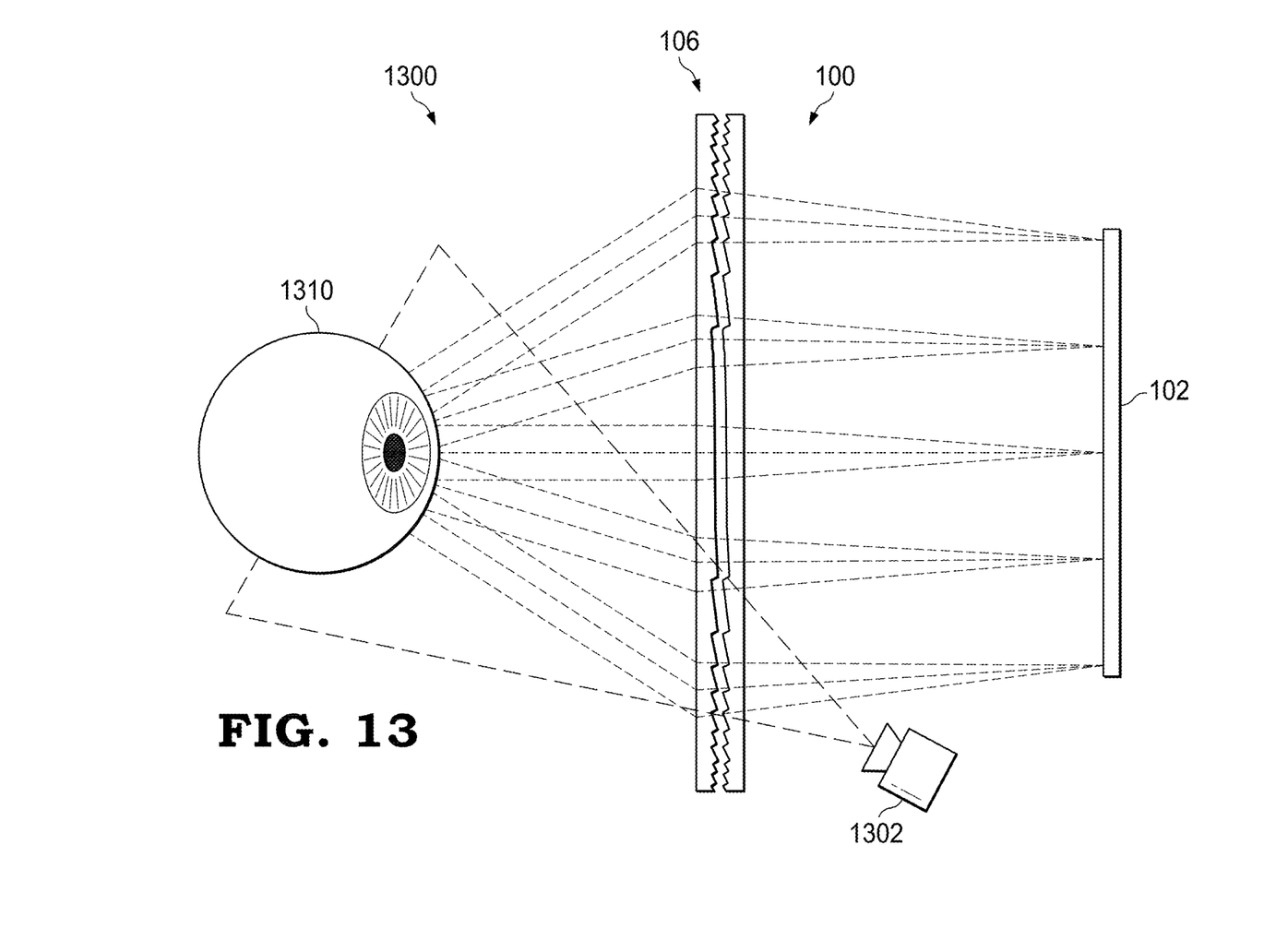
FIG. 13 illustrates a side cross-section view of an example eye-tracking implementation in an optic system having a Fresnel-based varifocal lens assembly via according to some embodiments.

FIG. 13 illustrates an gaze tracking configuration for use with an optical system having tunable focus in accordance with some embodiments. HMDs and other near-eye display systems frequently utilize a gaze tracking system to track the gaze direction of one or both of a user's eyes. The tracked gaze direction may be used, for example, to foveate a view based on a display region identified from the gaze direction, or to otherwise control the display image rendering operation. Such gaze tracking systems typically include an infrared light source or other light source to illuminate the user's eye, a camera to capture imagery of the illuminated eye, and a processing component to process the captured imagery to determine current gaze direction. As illustrated by configuration 1300 of FIG. 13, a system employing an optical system as described herein (using optical system 100 as an example) can position a gaze-tracking camera 1302 at a periphery between the lens assembly 106 and the display panel 102, with the gaze-tracking camera 1302 focused on the user's eye 1310 through the lens assembly 106 so that the gaze-tracking camera 1302 captures light reflected off of the user's eye. Alternatively, in some embodiments, the gaze-tracking camera 1302 is disposed between the lens assembly 106 and the user's eye 1310 so as to directly capture light reflected from the user's eye 100. In such instances, the IR light may be directed toward the eye using one or more IR light emitting diodes (LEDs) disposed, for example, around the outer diameter of the illustrated lens assembly, and aimed at the user's eye 1310.

Figure 14:
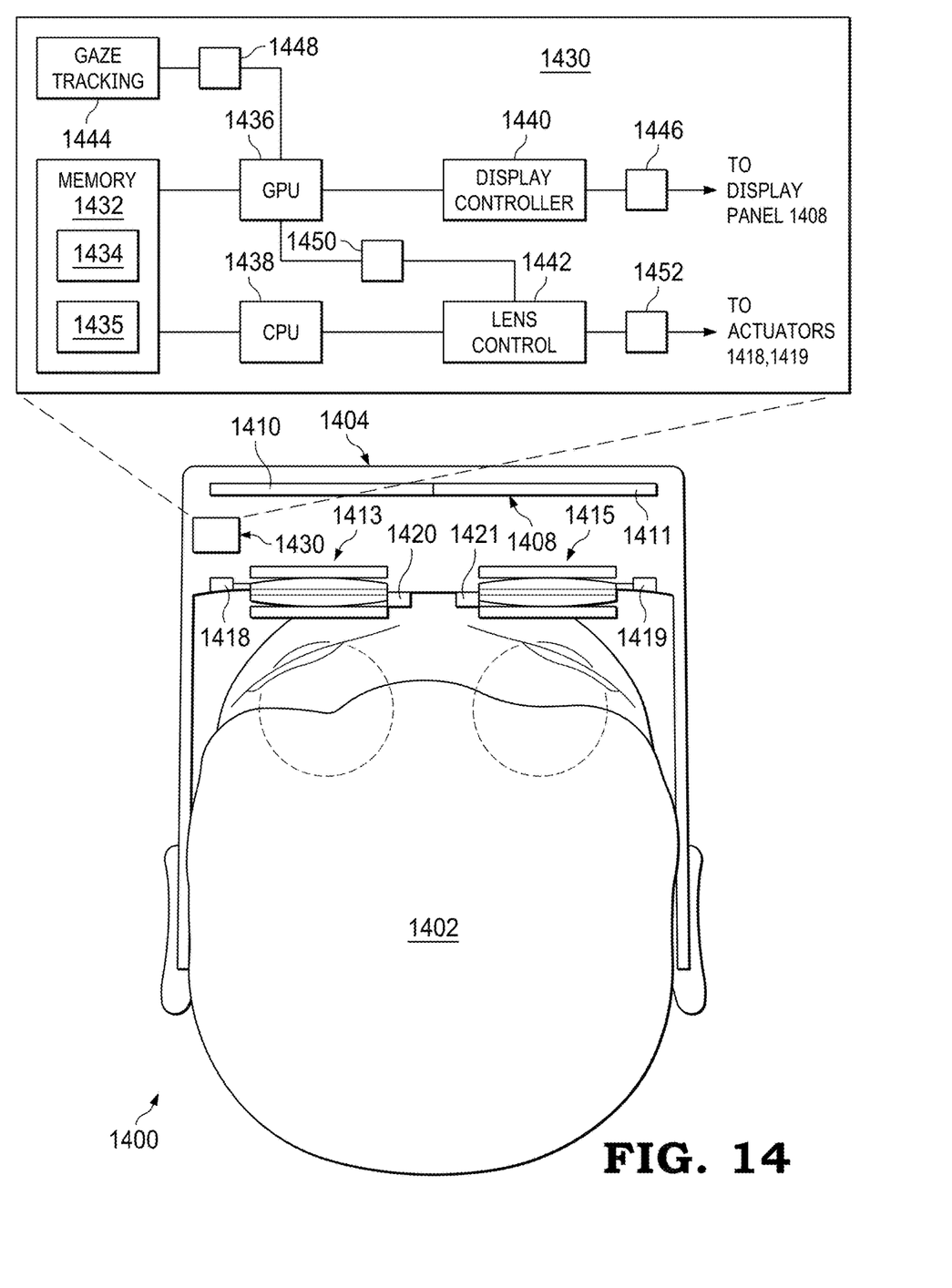
FIG. 14 illustrates a top cross-section view of a near-eye display system employing a pair of optic systems having a Fresnel-based varifocal lens assembly in accordance with some embodiments.

FIG. 14 illustrates a top cross-section view of a near-eye display system 1400 configured to provide virtual reality, augmented reality, or mixed reality functionality in accordance with some embodiments. The system 1400 may be implemented as a portable user device, such as an HMD, a tablet computer, computing-enabled cellular phone (e.g., a "smartphone"), a notebook computer, a personal digital assistant (PDA), a gaming console system, and the like. In other embodiments, the system 1400 can include a fixture device, such as medical imaging equipment, a security imaging sensor system, an industrial robot control system, a drone control system, and the like. For ease of illustration, the system 1400 is generally described herein in the example context of an HMD device and thus is also referred to as "HMD 1400"; however, the system 1400 is not limited to these example implementations.

The HMD 1400 is depicted as being mounted on a head 1402 of a user. As illustrated, the HMD 1400 includes a housing 1404 that includes a display panel 1408 that is configured to emit display light representative of an image for presentation to the user, and is one embodiment of the display panel 102. The display panel 1408 provides a left display 1410 and a right display 1411 that are used to display stereoscopic images to a corresponding left eye and right eye of the user. In other embodiments, separate display panels are used to provide each of the left-eye and right-eye displays 1410, 1411.

The HMD 1400 further includes eyepiece optical systems 1413, 1415 disposed in corresponding apertures or other openings in a user-facing surface of the housing 1404, for the left eye and right eye, respectively, of the user. The optical systems 1413, 1415 each implement an optical system that utilizes a varifocal Fresnel-based lens assembly, such as the embodiments of the optical system 100 of FIGS. 1-13. To this end, the HMD 1400 further includes actuators 1418, 1419 for the optical systems 1413, 1415, respectively, which are configured to one or both of: laterally translate one or both of the phase mask plates (e.g., phase mask plates 112, 114) of the corresponding lens assembly; or rotate one or both of the phase mask plates about the optical axis of the corresponding lens assembly, so as to tune the focus of the corresponding optical system. The actuators 1418, 1419 can comprise, for example, motor servos, electromagnetic actuators, screw-drive-based actuators, voice-coil actuators, and the like. Further, the HMD 1400 can include one or more gaze-tracking cameras, such as gaze-tracking cameras 1420, 1421 for the left eye and right eye, respectively.

The HMD 1400 further includes, or is in wired or wireless communication with, an electronic subsystem 1430 that provides display imagery for display at the display panel 808 and otherwise controls operation of the HMD 1400. In the depicted example, the electronic subsystem 1430 includes a system memory 1432 to store one or more software applications 1434, one or more processors to execute the one or more software applications 1434, such as a central processing unit (CPU) 1438 and a graphics processing unit (GPU) 1436, a display controller 1440 to control the display panel 1408, a lens control module 1442 to control the actuators 1418, 1419, and a gaze tracking module 1444 to track the gaze direction of the user's eyes. The modules 1442, 1444 each may be implemented as software executed by one or both of the CPU 1438 or GPU 1436 (e.g., as part of the software application 1434), as hardcoded logic (e.g., an application specific integrated circuit (ASIC)), programmable logic (e.g., a field programmable gate array (FPGA)), or a combination thereof.

In operation, the CPU 1438 and GPU 1436 coordinate through execution of one or more software applications 1434 to render a sequence of pairs of display images 1446 provided via the display controller 1440 for display at the left-eye and right-eye displays 1410, 1411 of the display panel 1408 so as to present stereoscopic VR or AR display content to the user. To this end, the CPU 1438 or GPU 1436 may obtain current gaze direction information 1448 from the gaze tracking module 844 (which determines the gaze direction from eye imagery captured via the cameras 1420, 1421 using any of a variety of well-known techniques), and use this gaze direction information 1448 to control rendering of one or more corresponding pairs of display images 1446.

Further, in at least one embodiment, for each display image 1446 being rendered by the GPU 1436, the GPU 1436 determines a focal depth parameter 1450 or other depth information for the display image 1446. The focal depth parameter 1450 may represent, for example, various forms of depth information, such as an average depth of objects in the entire display image 1446 (e.g., by averaging all of the pixel depth values or geometric primitive depth values in a Z buffer or depth buffer associated with the display image 1446), a center field depth, an average depth of an image region that is the target or focus of the current gaze point, the depth of an object of prominence in the display image 1446, and the like. More generally, the focal depth parameter 1450, in some embodiments, represents the ideal focal depth for the optic systems 1413, 1415 when viewing the corresponding pair of display image 1446 so as to reduce or eliminate the potential for vergence-accommodation conflict and/or to provide corrective optical power to compensate for deficiencies in the user's vision. Further, when the mechanical actuation, frame rate (frames/second or fps), and rendering are sufficiently fast, multiple depth planes can be displayed rapid succession to enable a multi-focal display system. Thus, the lens control module 1442 utilizes this focal depth parameter 1450 to determine a corresponding amount of lateral translation of the movable lens elements of the Fresnel-based varifocal lens assemblies of the optical systems 1413, 1415 that would alter the optical power of the Fresnel-based varifocal lens assemblies sufficiently to provide a commensurate focal length for the optical systems 1413, 1415. The lens control module 1442 then generates signaling 1452 that triggers the actuators 1418, 1419 to laterally translate, rotate, or a combination of laterally translate and rotate the movable phase mask plate(s) by identified amounts (with lateral translation in opposite directions and rotations in opposite directions when the poses of both plates are manipulated), and thus configure the optical systems 1413, 1415 for an optical power and focal length better tuned to the pair of display images 1446 being displayed at that point. This process then may repeat for each pair of display images 1446, each set of X display images 1446 (X>1), and the like. Further, in some embodiments, the memory 1432 may store one or more distortion maps 1435 that may be applied by the GPU 1436 during the rendering process for each display image 1446 to warp the image being rendered so as to pre-compensate for magnification changes induced by the varifocal lens assembly as a result of the focus tuning process.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
  a display panel configured to emit display light representative of a display image; and
  a lens assembly disposed along an optical axis between the display panel and an expected position of a user's eye, the lens assembly comprising:
    a first phase mask plate having a first major surface facing the display panel and a second major surface opposite the first major surface, the second major surface implementing a first freeform Fresnel lens structure;
    a second phase mask plate adjacent and parallel to the first phase mask plate and having a third major surface facing the second major surface and an opposing fourth major surface, the third major surface implementing a second freeform Fresnel lens structure; and
    a lens control module configured to determine an amount of an adjustment to a pose of at least one of the first and second phase mask plates relative to the other of the first and second phase mask plates based on depth information associated with the display image.

2. The apparatus of claim 1, wherein the pose is configured to be adjusted by lateral translation of one of the first and second phase mask plates relative to the other of the first and second phase mask plates.

3. The apparatus of claim 2, wherein:
  each of the first freeform Fresnel lens structure and the second freeform Fresnel lens structure represents a cubic phase function; and
  superimposition of the first and second freeform Fresnel lens structures along the optical axis results in a quadradic phase effect that is variable responsive to the lateral translation.

4. The apparatus of claim 1, wherein the pose is configured to be adjusted by rotation of one of the first and second phase mask plates relative to the other of the first and second phase mask plates.

5. The apparatus of claim 4, wherein:
  each of the first and second freeform Fresnel lens structures represents a quadratic phase function with a 2*pi phase winding; and superimposition of the first and second freeform Fresnel lens structures along the optical axis results in a quadradic phase effect that is variable responsive to the rotation.

6. The apparatus of claim 1, further comprising:
an actuator configured to implement the adjustment to the pose of the at least one of the first and second phase mask plates relative to the other of the first and second phase mask plates.

7. The apparatus of claim 6, wherein:
the depth information is determined based on at least one of: a center field depth; an averaging of depth values of a depth buffer associated with the display image; a gaze point of eyes of the user; and a vergence of the eyes of the user.

8. The apparatus of claim 7, further comprising:
a gaze tracking camera configured to capture imagery of the user's eye through the lens assembly for gaze tracking.

9. The apparatus of claim 1, further comprising:
a processor configured to render the display image for display at the display panel.

10. An apparatus, comprising:
a display panel configured to emit display light representative of a display image;
a processor configured to render the display image for display at the display panel; and
a lens assembly disposed along an optical axis between the display panel and an expected position of a user's eye, the lens assembly comprising:
a first phase mask plate having a first major surface facing the display panel and a second major surface opposite the first major surface, the second major surface implementing a first freeform Fresnel lens structure; and
a second phase mask plate adjacent and parallel to the first phase mask plate and having a third major surface facing the second major surface and an opposing fourth major surface, the third major surface implementing a second freeform Fresnel lens structure;
wherein a pose of at least one of the first and second phase mask plates relative to the other of the first and second phase mask plates is configured to be adjusted to adjust an optical power of the lens assembly; and
wherein the processor is configured to apply a distortion map during rendering of the display image to pre-compensate for one or more magnification changes introduced by the lens assembly.

11. A method comprising:
emitting display light representative of a display image from a display panel toward a user's eye via a lens assembly, the lens assembly including a first phase mask plate having a first major surface facing the display panel and a second major surface opposite the first major surface, the second major surface implementing a first freeform Fresnel lens structure; and a second phase mask plate adjacent and parallel to the first phase mask plate and having a third major surface facing the second major surface and an opposing fourth major surface, the third major surface implementing a second freeform Fresnel lens structure; and
adjusting a pose of at least one of the first and second phase mask plates relative to the other of the first and second phase mask plates to adjust an optical power of the lens assembly for the display image, wherein adjusting the pose includes determining an amount of an adjustment of the pose based on depth information associated with the display image.

12. The method of claim 11, wherein adjusting the pose includes lateral translation of one of the first and second phase mask plates relative to the other of the first and second phase mask plates.

13. The method of claim 12, wherein:
each of the first freeform Fresnel lens structure and the second freeform Fresnel lens structure represents a cubic phase function; and
superimposition of the first and second freeform Fresnel lens structures along the optical axis results in a quadradic phase effect that is variable responsive to the lateral translation.

14. The method of claim 11, wherein adjusting the pose includes rotation of one of the first and second phase mask plates relative to the other of the first and second phase mask plates.

15. The method of claim 14, wherein:
each of the first and second freeform Fresnel lens structures represents a quadratic phase function with a 2*pi phase winding; and
superimposition of the first and second freeform Fresnel lens structures along the optical axis results in a quadradic phase effect that is variable responsive to the rotation.

16. The method of claim 11, further comprising:
determining the depth information based on at least one of: a center field depth; an averaging of depth values of a depth buffer associated with the display image; a gaze point of the eyes of the user; and a vergence of the eyes of the user.

17. The method of claim 11, further comprising:
tracking a gaze of the user's eye based on imagery of the user's eye captured through the lens assembly.

18. A method, comprising:
emitting display light representative of a display image from a display panel toward a user's eye via a lens assembly, the lens assembly including a first phase mask plate having a first major surface facing the display panel and a second major surface opposite the first major surface, the second major surface implementing a first freeform Fresnel lens structure; and a second phase mask plate adjacent and parallel to the first phase mask plate and having a third major surface facing the second major surface and an opposing fourth major surface, the third major surface implementing a second freeform Fresnel lens structure; and
adjusting a pose of at least one of the first and second phase mask plates relative to the other of the first and second phase mask plates to adjust an optical power of the lens assembly for the display image;
tracking a gaze of the user's eye based on imagery of the user's eye captured through the lens assembly; and
rendering the display image for display at the display panel based on the tracked gaze.

19. The method of claim 18, wherein rendering the display image includes applying a distortion map to pre-compensate for one or more magnification changes introduced by the lens assembly.

20. An augmented reality (AR) display system comprising:
a display panel configured to emit display light representative of a display image;
a first optic system disposed facing a first portion of the display panel and a second optic system disposed facing a second portion of the display panel, wherein each of the first optic system and the second optic system comprises two parallel phase mask plates having Fresnel lens structures defining a gap between the two phase mask plates, and whereby a pose of at least one of the phase mask plates is adjustable relative to the other phase mask plate; and a lens control module to configure an optical power of the first and second optic systems through adjustment of the poses of the phase mask plates for user viewing of the display image.

21. The AR display system of claim 20, wherein adjustment of the pose of a phase mask plate includes at least one of: lateral translation of the phase mask plate; and rotation of the phase mask plate.

22. The AR display system of claim 20, wherein the lens control module is to configure the optical power of the first and second optic systems based on at least one of: depth information for the display image; and eye tracking information for at least one eye of a user.

* * * * *